US012736436B2

(12) United States Patent
Kuo et al.

(10) Patent No.: US 12,736,436 B2
(45) Date of Patent: Sep. 15, 2026

(54) TESTING METHOD FOR NEAR-EYE DISPLAY DEVICE AND ELECTRONIC DEVICE

(71) Applicants: Interface Advanced Technology (Chengdu) Co., Ltd., Chengdu (CN); Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventors: Yu-Mei Kuo, New Taipei (TW); Shang-Yu Huang, Hsinchu (TW)

(73) Assignees: Interface Advanced Technology (Chengdu) Co., Ltd., Chengdu (CN); Interface Technology (ChengDu) Co., Ltd., Chengdu (CN); INTERFACE OPTOELECTRONICS (SHENZHEN) CO., LTD, Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 0 days.

(21) Appl. No.: 19/449,719

(22) Filed: Jan. 15, 2026

(65) Prior Publication Data

US 2026/0140014 A1 May 21, 2026

Related U.S. Application Data

(63) Continuation-in-part of application No. PCT/CN2024/130877, filed on Nov. 8, 2024.

(51) Int. Cl.

| | |
|---|---|
| ***G06M 11/02*** | (2006.01) |
| ***G01M 11/02*** | (2006.01) |
| ***G02B 27/01*** | (2006.01) |

(52) U.S. Cl.
CPC .... *G01M 11/0264* (2013.01); *G01M 11/0207* (2013.01); *G02B 27/01* (2013.01);
(Continued)

(58) Field of Classification Search
None
See application file for complete search history.

(56) References Cited

U.S. PATENT DOCUMENTS

| | | | | |
|---|---|---|---|---|
| 11,927,756 | B2 * | 3/2024 | Jeong | G06T 11/00 |
| 12,211,151 | B1 * | 1/2025 | Chiou | G06T 19/003 |

(Continued)

FOREIGN PATENT DOCUMENTS

| | | | | |
|---|---|---|---|---|
| CN | 209417442 U | | 9/2019 | |
| CN | 118641154 A | * | 9/2024 | G02B 27/01 |

*Primary Examiner* — Anand P Bhatnagar
(74) *Attorney, Agent, or Firm* — ScienBiziP, P.C.

(57) ABSTRACT

The present application is applicable to a field of optical detection technology, and provides a testing method for a near-eye display device and an electronic device. The method acquires first captured images of a test point displayed by the near-eye display device, according to a plurality of preset virtual image distances. According to a sharpness of each of the first captured images, the second captured image is determined from the first captured images. According to a preset virtual image distance corresponding to the second captured image, the standard position corresponding to the test point in the second captured image is determined. According to a measured position and the standard position corresponding to the test point in the second captured image, the detection result of the near-eye display device is determined. The above method can improve the detection efficiency and the detection accuracy of the near-eye display device.

20 Claims, 11 Drawing Sheets

(52) U.S. Cl.
CPC .............................. *G02B 2027/011* (2013.01); *G02B 2027/0138* (2013.01); *G02B 2027/0198* (2013.01)

(56) References Cited

U.S. PATENT DOCUMENTS

| | | | | |
|---|---|---|---|---|
| 12,265,225 | B2 * | 4/2025 | Nakamura | G02B 27/0172 |
| 12,332,456 | B2 * | 6/2025 | Porter | G02B 27/0179 |
| 12,339,458 | B2 * | 6/2025 | Kaehler | G02B 27/0172 |
| 12,373,030 | B2 * | 7/2025 | He | G06F 3/015 |
| 12,443,043 | B2 * | 10/2025 | Lai | G02B 27/0172 |
| 2023/0251494 | A1 * | 8/2023 | Cai | G02B 27/10 345/8 |
| 2023/0341683 | A1 * | 10/2023 | Jia | H04N 13/344 |
| 2023/0360567 | A1 * | 11/2023 | Yang | G09G 3/002 |
| 2024/0118550 | A1 * | 4/2024 | Lai | G02B 27/0172 |
| 2024/0231114 | A1 * | 7/2024 | Porter | G02B 27/0172 |
| 2024/0272443 | A1 * | 8/2024 | Schultz | G02B 27/62 |

* cited by examiner

TESTING METHOD FOR NEAR-EYE DISPLAY DEVICE AND ELECTRONIC DEVICE

FIELD

The present application relates to a field of optical detection technology, and in particular relates to a testing method for a near-eye display device and an electronic device.

BACKGROUND

With the development of information display technology, near-eye display (NED) devices can be applied to Virtual Reality (VR) and Augmented Reality (AR). In order to ensure a quality of near-eye display devices and avoid issues such as poor imaging quality during using the near-eye display devices, quality testing of the near-eye display devices is typically required. In related technologies, manual judgment-based methods are employed for quality testing, which not only results in low testing efficiency but also easily leads to testing errors.

DESCRIPTION

Figure 1:
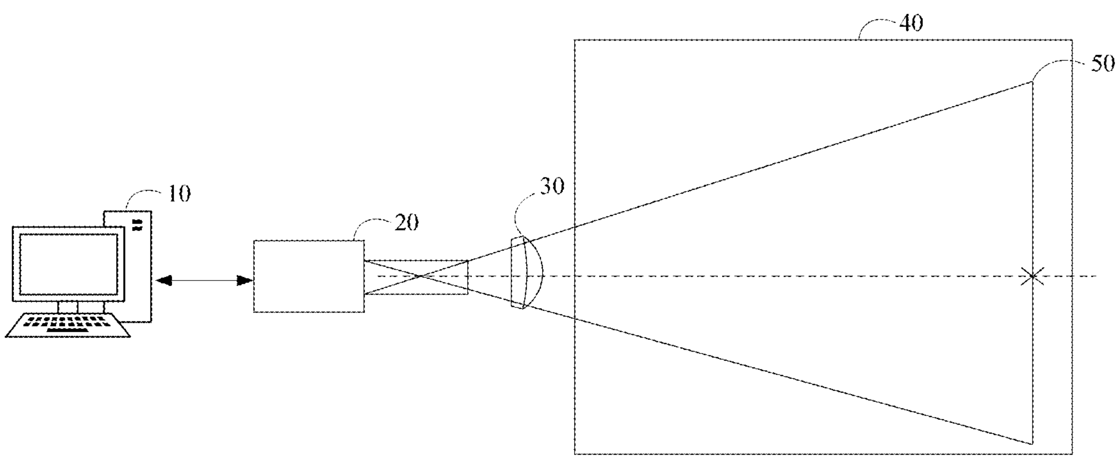
FIG. 1 is an application scenario diagram of a testing method for the near-eye display device provided by embodiments of the present application.

To make the objectives, technical solutions, and advantages of the present application clearer, detailed descriptions will be given below in conjunction with the drawings and specific embodiments.

It should be noted that "at least one" in the present application means one or more, and "multiple" means two or more than two. "And/or" describes an association relationship of associated objects, indicating that three relationships may exist. For example, A and/or B may indicate: A exists alone, both A and B exist, or B exists alone, where A and B can be singular or plural. Terms "first", "second", "third", "fourth", etc. (if they exist) in the specification, claims, and drawings of the present application are used to distinguish similar objects, rather than to describe specific sequences or orders.

In the embodiments of the present application, words like "exemplary" or "for example" are used to provide examples, illustrations, or explanations. Any embodiment or design scheme described as "exemplary" or "for example" in the embodiments of the present application should not be interpreted as being more preferred or advantageous than other embodiments or design schemes. More precisely, the use of words like "exemplary" or "for example" is intended to present relevant concepts in a specific way. When there is no conflict, the features of different embodiments can be combined with each other.

Currently, the near-eye display (NED) devices are mainly assembled through mechanical positioning mechanisms. However, this assembly method still cannot guarantee alignment between an imaging center of the near-eye display device and an optical axis center, resulting in issues such as poor imaging quality during operation. Therefore, quality testing on the near-eye display devices has become an urgent problem to be resolved.

In related testing solutions for the near-eye display devices, quality testing is performed on the near-eye display devices to obtain testing results. However, this approach relies on manual judgment-based methods for quality testing, leading to low testing efficiency and poor accuracy. Additionally, since the testing results obtained through related solutions cannot reflect the offset conditions of the near-eye display device under optimal optical performance, subsequent calibration cannot be directly performed based on the testing results, which adversely affects user experience.

Based on the above issues, the embodiments of the present application provide a testing method for a near-eye display device. Since manual quality testing is not required, the testing method effectively avoids testing errors and low testing efficiency caused by manual judgment. Furthermore, the testing results determined in this embodiment can reflect the offset conditions of the near-eye display device under optimal optical performance. Therefore, the testing results determined in this embodiment can be used to calibrate the near-eye display device, thereby improving user experience.

As shown in FIG. 1, FIG. 1 is an application scenario diagram of a testing method for the near-eye display device provided by embodiments of the present application.

In some embodiments, the testing method for the near-eye display device can be applied to one or more electronic devices 10. The electronic device 10 is used to control a camera device 20 to capture information displayed by a near-eye display device 30, and the electronic device 10 is also used to test a quality of the near-eye display device 30. The camera device 20 includes a main body and a lens, the lens can be mounted on the main body of the camera device 20. The near-eye display device 30 includes a lens and a display screen. The application scenario diagram provided in this embodiment also includes a virtual image space 40, which is used to display images captured by the camera device 20, such as an image 50 as shown in FIG. 1.

Referring to FIG. 1, the camera device 20 is coaxial with the near-eye display device 30. When the near-eye display device 30 is in an optimal optical performance state, the imaging center of the near-eye display device 30 (e.g., a center of image 50) is aligned with an optical axis center (e.g., an axis center of the camera device 20 and the near-eye display device 30).

The electronic device 10 can be any electronic product capable of human-machine interaction, such as personal computers, tablet computers, smartphones, Personal Digital Assistants (PDA), game consoles, Internet Protocol Television (IPTV), smart wearable devices, etc.

The electronic device 10 may include network devices and/or user devices. The network devices include, but are not limited to, single network electronic devices, electronic device groups including a plurality of network electronic devices, or clouds including a large number of hosts or network electronic devices based on Cloud Computing.

The network where the electronic device 10 is located may include but is not limited to: Internet, Wide Area Network, Metropolitan Area Network, Local Area Network, Virtual Private Network (VPN).

Figure 2:
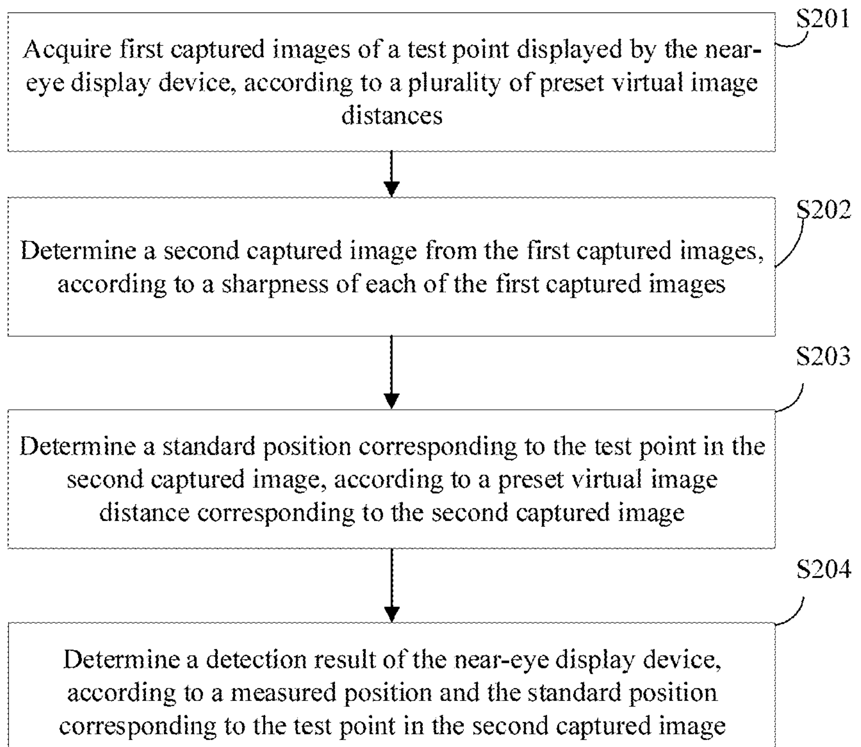
FIG. 2 is a flowchart of a testing method for the near-eye display device provided by embodiments of the present application.

As shown in FIG. 2, FIG. 2 is a flowchart of a testing method for the near-eye display device provided by embodiments of the present application. The testing method for a near-eye display device is applied to an electronic device, such as the electronic device 10 in FIG. 1. According to different requirements, the order of steps in this flowchart can be changed, and some steps can be omitted.

In block S201, first captured images of a test point displayed by the near-eye display device are acquired, according to a plurality of preset virtual image distances.

In at least one embodiment of the present application, a test point is displayed on a display screen of the near-eye display device. The test point can be any point in an image displayed on the display screen, for example, the test point can be a center point of the image displayed on the display screen.

Figure 3:
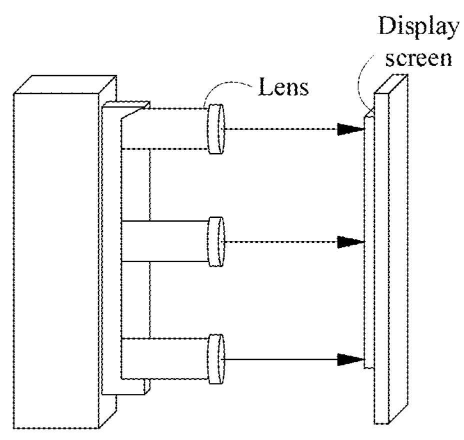
FIG. 3 is a schematic diagram showing initial alignment between a camera device and a display screen in a near-eye display device provided by embodiments of the present application.

In at least one embodiment of the present application, before the camera device captures the test point displayed on the display screen of the near-eye display device, an initial alignment is performed between the camera device and the display screen to ensure that the lens of the camera device is parallel to the display screen. Please refer to FIG. 3, which shows a schematic diagram of the initial alignment between the camera device and the display screen of the near-eye display device. FIG. 3 shows lenses of three camera devices and the display screen of the near-eye display device, where the lenses of three camera devices are parallel to the display screen of the near-eye display device. By performing the initial alignment between the camera device and the display screen, the test point can be captured to avoid being affected by non-parallel alignment between the lens of the camera device and the display screen, thereby avoiding the influence on the first captured images.

In at least one embodiment of the present application, each of the preset virtual image distances indicate a distance between the human eye and the virtual image space 40. For example, in response that the lens of the camera device 20 represents the human eye, each of the preset virtual image distances indicate a distance between the lens of the camera device 20 and the virtual image space 40. The plurality of preset virtual image distances can be set based on a first preset value and a second preset value, the first preset value and the second preset value can be set and adjusted according to actual requirements. The first preset value can be any preset virtual image distance, and the second preset value can be a minimum value selected from the absolute differences between any two preset virtual image distances. For example, in response that the first preset value is one meter and the second preset value is fifty millimeters, and a number of the preset virtual image distances are nineteen, the preset virtual image distances can be 0.955 meters, 0.960 meters, 0.965 meters, 0.970 meters, 0.975 meters, 0.980 meters, 0.985 meters, 0.990 meters, 0.995 meters, 1 meter, 1.005 meters, 1.010 meters, 1.015 meters, 1.020 meters, 1.025 meters, 1.030 meters, 1.035 meters, 1.040 meters, and 1.045 meters.

In at least one embodiment of the present application, the electronic device can be connected to the camera devices. At any preset virtual image distance, each of the camera devices can capture the test point displayed on the display screen of the near-eye display device, thereby obtaining the first captured images of the test point from each of the camera devices.

Figure 4:
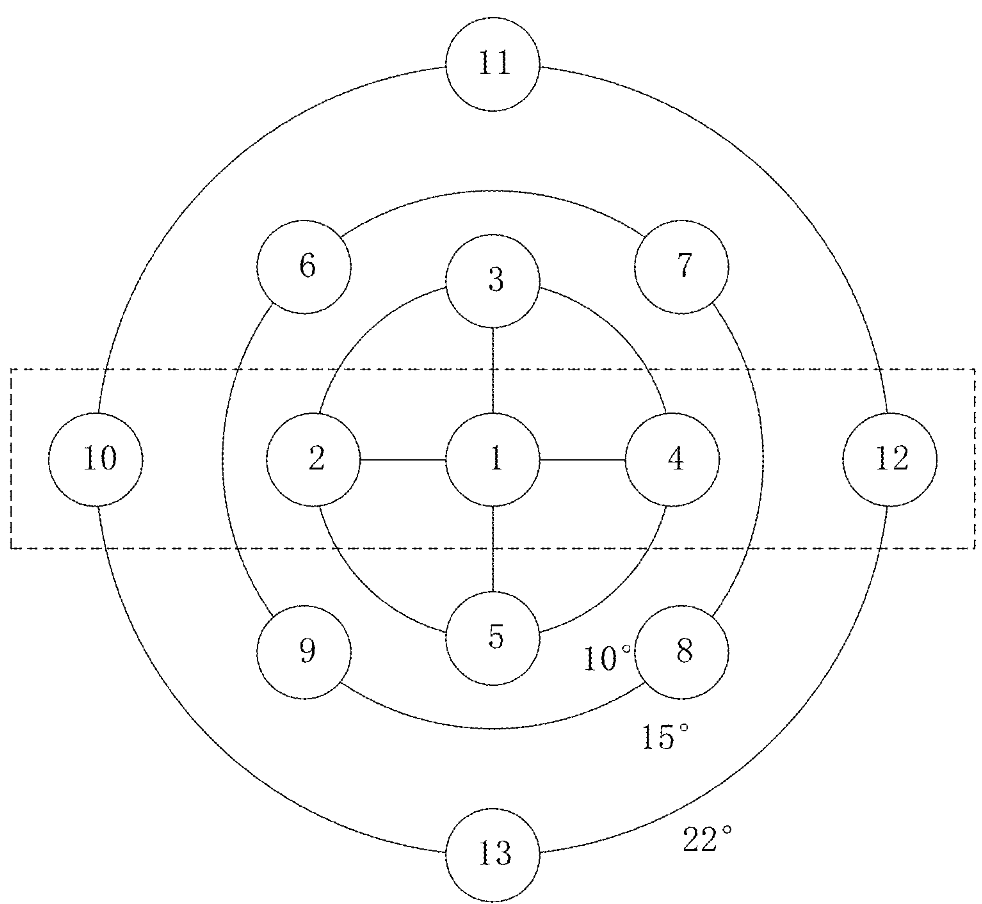
FIG. 4 is a distribution diagram of a plurality of camera devices provided by embodiments of the present application.

FIG. 4 is a distribution diagram of a plurality of camera devices provided by embodiments of the present application. Referring to FIG. 4, it shows the distribution of 13 camera devices, which includes camera device "1", camera device "2", camera device "3", camera device "4", camera device "5", camera device "6", camera device "7", camera device "8", camera device "9", camera device "10", camera device "11", camera device "12", and camera device "13".

A distance between the camera device "1" and the camera device "2", a distance between the camera device "1" and the camera device "3", a distance between the camera device "1" and the camera device "4", and a distance between the camera device "1" and the camera device "5" are the same. A distance between the camera device "1" and the camera device "6", a distance between the camera device "1" and the camera device "7", a distance between the camera device "1" and the camera device "8", and a distance between the camera device "1" and the camera device "9" are the same. A distance between the camera device "1" and the camera device "10", a distance between the camera device "1" and the camera device "11", a distance between the camera device "1" and the camera device "12", and a distance between the camera device "1" and the camera device "13" are the same. A distance between the camera device "2" and the camera device "1" is less than a distance between the camera device "6" and the camera device "1", the distance between the camera device "6" and the camera device "1" is less than a distance between the camera device "10" and the camera device "1".

A vertical angle between the camera device "1" and the near-eye display device is 0 degrees. A vertical angle between the camera device "2" and the near-eye display device, a vertical angle between the camera device "3" and the near-eye display device, a vertical angle between the camera device "4" and the near-eye display device, a vertical angle between the camera device "5" and the near-eye display device are the same. For example, the vertical angle between the camera device "2" and the near-eye display device is 10°, the vertical angle between the camera device "3" and the near-eye display device is 10°, the vertical angle between the camera device "4" and the near-eye display device is 10°, and the vertical angle between the camera device "5" and the near-eye display device is 10°.

A vertical angle between the camera device "6" and the near-eye display device, a vertical angle between the camera device "7" and the near-eye display device, a vertical angle between the camera device "8" and the near-eye display device, a vertical angle between the camera device "9" and the near-eye display device are the same. For example, the vertical angle between the camera device "6" and the near-eye display device is 15°, the vertical angle between the camera device "7" and the near-eye display device is 15°, the vertical angle between the camera device "8" and the near-eye display device is 15°, and the vertical angle between the camera device "9" and the near-eye display device is 15°.

A vertical angle between the camera device "10" and the near-eye display device, a vertical angle between the camera device "11" and the near-eye display device, a vertical angle between the camera device "12" and the near-eye display device, a vertical angle between the camera device "13" and the near-eye display device are the same. For example, the vertical angle between the camera device "10" and the near-eye display device is 22°, the vertical angle between the camera device "11" and the near-eye display device is 22°, the vertical angle between the camera device "12" and the near-eye display device is 22°, and the vertical angle between the camera device "13" and the near-eye display device is 22°.

Figure 5:
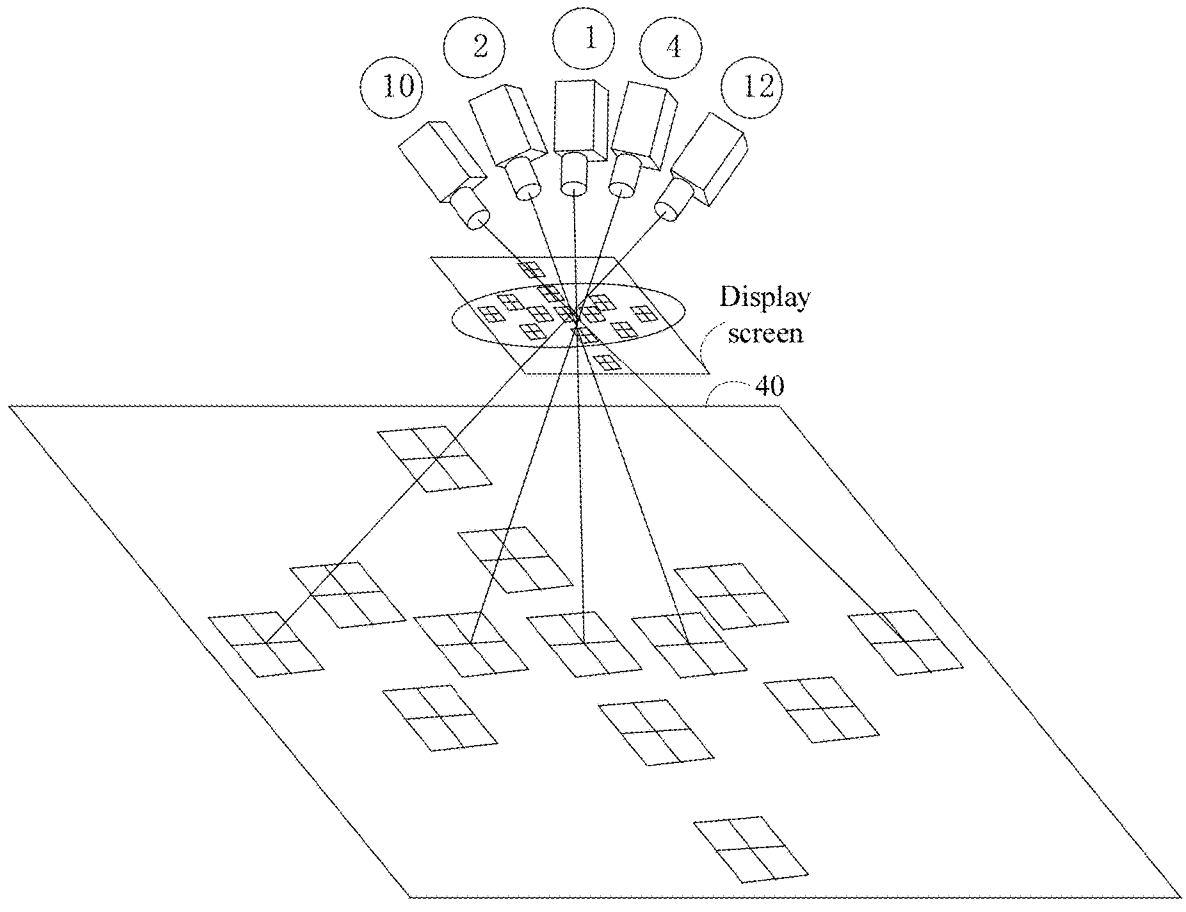
FIG. 5 is a schematic diagram of first captured images obtained by the camera devices provided by embodiments of the present application.

FIG. 5 is a schematic diagram of first captured images obtained by the camera devices provided by embodiments of the present application. As shown in FIG. 5, the camera device "1", the camera device "2", the camera device "4", "10", and the camera device "12" capture the test point displayed on the display screen of the near-eye display device, and each of the camera devices obtains first captured images. For example, in response that there are 19 preset virtual image distances, the camera device "1" captures the test point displayed on the display screen of the near-eye display device based on each of the 19 distances, and the camera device "1" obtains 19 first captured images. As shown in FIG. 4, in response that all 13 camera devices capture images based on 19 virtual image distances, there are 247 first captured images can be obtained, as 13*19=247.

In at least one embodiment of the present application, before the camera devices capture the test point displayed on the display screen of the near-eye display device, a camera calibration can be performed on the camera devices. By calibrating the camera devices, the impact of camera device installation quality on the first captured images can be avoided, thereby obtaining accurate and authentic images.

In at least one embodiment of the present application, in response that the camera devices have completed capturing the test point displayed on the display screen of the near-eye display device, the electronic device obtains the first captured images from the camera devices.

In block S202, a second captured image is determined from the first captured images, according to a sharpness of each of the first captured images.

In at least one embodiment of the present application, the sharpness of each of the first captured images can be calculated through a Modulation Transfer Function (MTF). In one embodiment, a first captured image with the highest sharpness can be selected from the first captured images as the second captured image. For example, at 19 virtual image distances, in response that 13 camera devices shown in FIG. 4 capture the test point displayed on the display screen, 247 first captured images can be obtained as 13*19=247, and the first captured image with the highest sharpness is determined from the 247 images to be the second captured image. Alternatively, at 19 virtual image distances, in response that 13 camera devices shown in FIG. 4 capture the test point displayed on the display screen, 19 first captured images corresponding to each of the camera devices can be obtained, and from the 19 first captured images corresponding to each of the camera devices, the first captured image with the highest sharpness is determined as the second captured image for each of the camera devices.

In at least one embodiment of the present application, the electronic device calculates the sharpness of each of the first captured images through the Modulation Transfer Function, and determines the first captured image with the highest sharpness as the second captured image.

In one embodiment, the electronic device determines a first signal based on image features of the first captured image, the electronic device converts the first signal through an optical simulation software and obtains a second signal. The electronic device determines the sharpness of each of the first captured images based on a maximum amplitude value and a minimum amplitude value in the second signal. A calculation formula for the sharpness of each of the first captured images can be: $MTF=(Amax-Amin)/(Amax+Amin)$, where the MTF represents the sharpness of each of the first captured images, the Amax represents the maximum amplitude value in the second signal, and the Amin represents the minimum amplitude value in the second signal.

In one embodiment, the image features of the first captured image can be extracted through a preset model. The preset model can be obtained by training with training images. Convergence conditions for the preset model may include but are not limited to a number of training iterations and a loss value of the preset model reaching a preset range. The electronic device encodes the first captured images based on pixel values of the first captured images, and obtains an encoding vector. The electronic device performs convolution operations on the encoding vector through the preset model and obtains the image features of the first captured images, the image features can be a vector or a matrix.

In one embodiment, the electronic device maps the image features of the first captured images to a parameter space of a sine signal through a mapping function, and the electronic device obtains the first signal. The optical simulation software can include but is not limited to ZEMAX software and CODEV software.

In these embodiments, the first signal can be accurately mapped through the image features of the first captured image, thereby improving the accuracy of the sharpness determination. The first signal can be quickly converted to the second signal using optical simulation software, which improves the determination efficiency of the second signal and consequently the determination efficiency of the sharpness of the first captured images.

In block S203, a standard position corresponding to the test point in the second captured image is determined, according to a preset virtual image distance corresponding to the second captured image.

Figure 6:
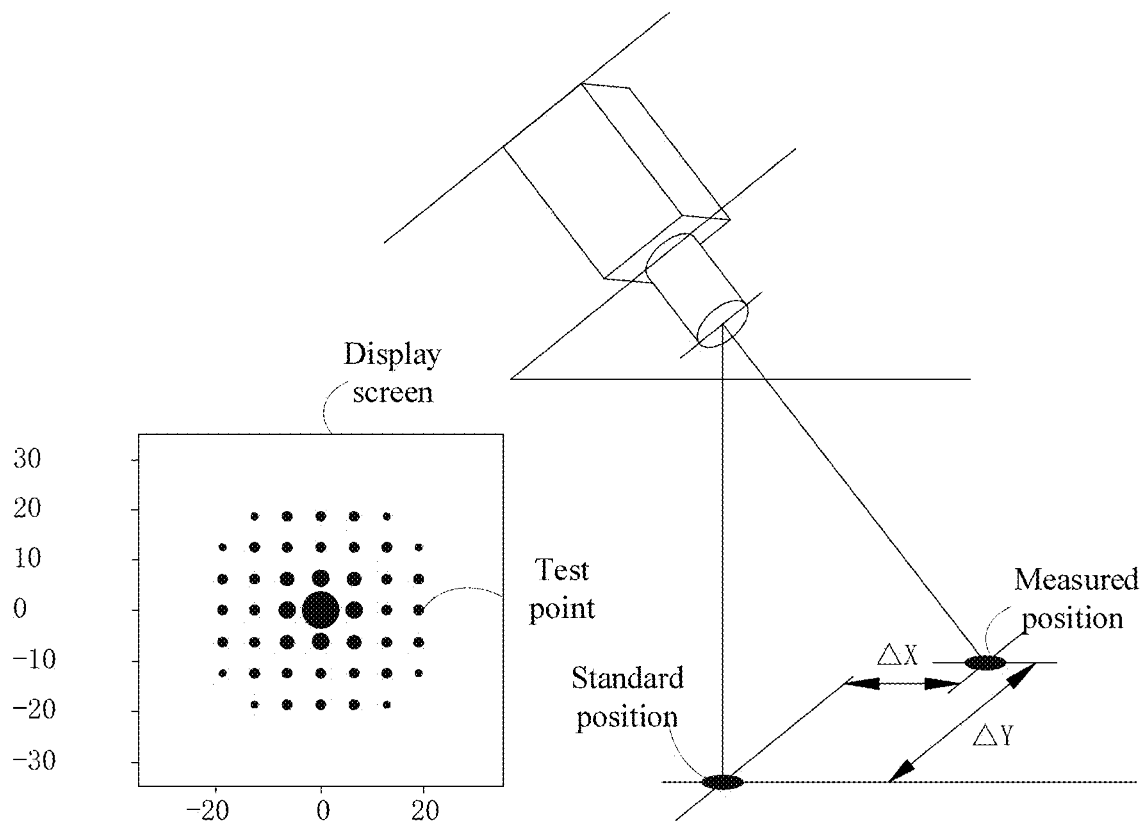
FIG. 6 is a schematic diagram of standard position and measured position provided by embodiments of the present application.

In at least one embodiment of the present application, the standard position can represent coordinate information of the test point in the second captured image when the imaging center of the near-eye display device 30 is aligned with the optical axis center. The standard position corresponds to the coordinate information of the test point in both horizontal and vertical directions. The determination method for the standard position includes: determining a corresponding matched standard image from a database according to the preset virtual image distance corresponding to the second captured image, and determining a pixel position corresponding to the test point in the standard image as the standard position corresponding to the test point in the second captured image, based on a display position of the test point on the display screen. The database stores corresponding relationships between the preset virtual image distances and images. For example, FIG. 6 is a schematic diagram of standard position and measured position provided by embodiments of the present application. As shown in FIG. 6, a coordinate system can be constructed based on a distance between any two pixel points in the second captured image. In response that the display position of the test point on the display screen is (0, 0), the pixel position corresponding to the test point in the standard image can be (0, 0), therefore, the standard position corresponding to the test point in the second captured image can be (0, 0).

S204, a detection result of the near-eye display device is determined, according to a measured position and the standard position corresponding to the test point in the second captured image.

In at least one embodiment of the present application, the measured position can be determined based on the pixel position of the test point in the second captured image. The measured position corresponds to the coordinate information of the test point in both horizontal and vertical directions. The detection result includes a first offset angle, which indicates an offset situation of the display screen in the near-eye display device.

In at least one embodiment of the present application, the electronic device determines the detection result of the near-eye display device, according to the measured position and the standard position corresponding to the test point in the second captured image by: determining a first offset distance in a first preset direction and a second offset distance in a second preset direction for the test point, according to the measured position and the standard position, and calculating the first offset angle based on the first offset distance and the second offset distance.

The first preset direction represents a horizontal direction, and the second preset direction represents a vertical direction. The first offset distance can be determined based on the measured position and the standard position of the test point in the horizontal direction, and the second offset distance can be determined based on the measured position and the standard position of the test point in the vertical direction. For example, as shown in FIG. 6, $\Delta X$ represents the first offset distance, and $\Delta Y$ represents the second offset distance. The calculation formula for the first offset angle can be: $\varphi=\arctan(\Delta X/\Delta Y)$, where $\varphi$ represents the first offset angle, $\Delta X$ represents the first offset distance, and $\Delta Y$ represents the second offset distance.

In these embodiments, the offset situation of the display screen in the near-eye display device can be accurately quantified based on the measured position and the standard position corresponding to the test point in the second captured image.

In another embodiment, in response that the second captured image includes a second captured image corresponding to each of the camera devices, the electronic device determines an initial offset angle for the near-eye display device corresponding to each of the camera devices based on the measured position and the standard position corresponding to the test point in each of second captured images, performs a weighted summation on initial offset angles and obtains the first offset angle. The calculation formula for the initial offset angle is the same as the above calculation formula for the first offset angle, it is not repeated here. In this embodiment, the influence of camera device performance on the first offset angle can be eliminated to some extent through the initial offset angles from the camera device, thereby improving the accuracy of the first offset angle.

Figure 7:
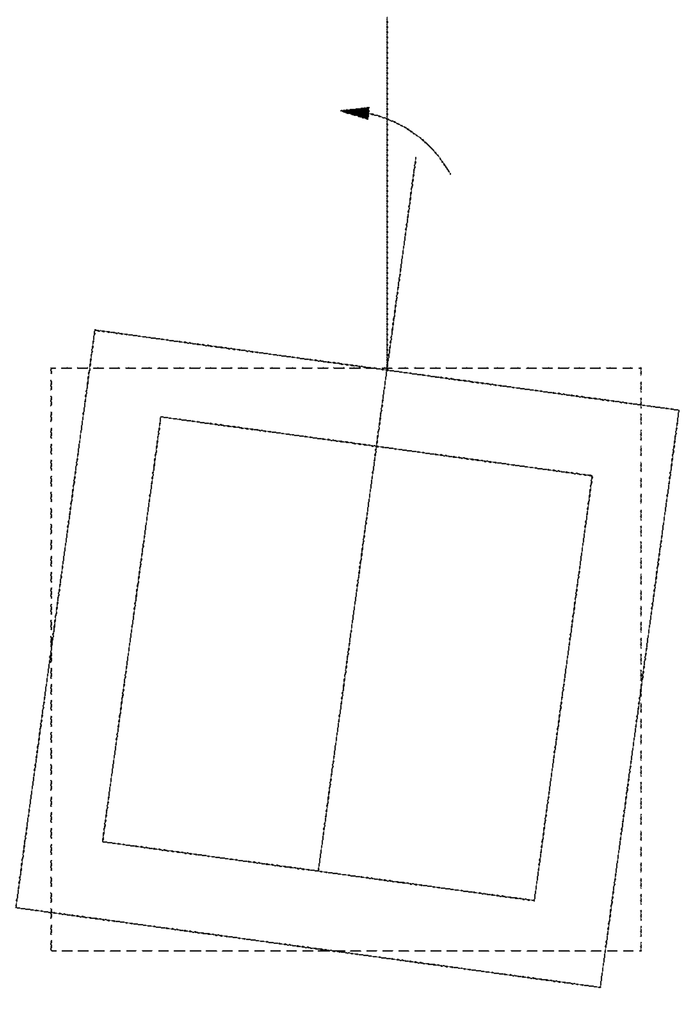
FIG. 7 is a schematic diagram showing rotation of a display screen in a near-eye display device provided by embodiments of the present application.

In at least one embodiment of the present application, the electronic device calibrates the near-eye display device by rotating the display screen based on the first offset angle in the detection result. For example, FIG. 7 is a schematic diagram showing rotation of a display screen in a near-eye display device provided by embodiments of the present application. As shown in FIG. 7, a solid-line rectangle represents the display screen in the near-eye display device before calibration, a dashed-line rectangle represents the display screen in the near-eye display device after calibration, and an arrow indicates a rotation direction of the display screen. In these embodiments, the imaging sharpness of the calibrated near-eye display device is ensured through the calibration of the display screen using the first offset angle, thereby resulting in improved performance of the near-eye display device.

In the embodiments of the present application, the first captured images of the test point displayed by the near-eye display device are acquired through the plurality of preset virtual image distances, and the second captured image is determined based on the sharpness of the first captured images, which is capable of obtaining the second captured image corresponding to the near-eye display device under optimal optical performance. By the preset virtual image distance corresponding to the second captured image, a standard position of the test point in the second captured image can be determined, and by combining the standard position and the measured position, the detection result of the near-eye display device under the optimal optical performance can be determined, thereby facilitating the calibration of the near-eye display device and improving user experience. In addition, since manual quality inspection is not required, it can avoid detection errors and low detection efficiency caused by manual judgment.

Figure 8:
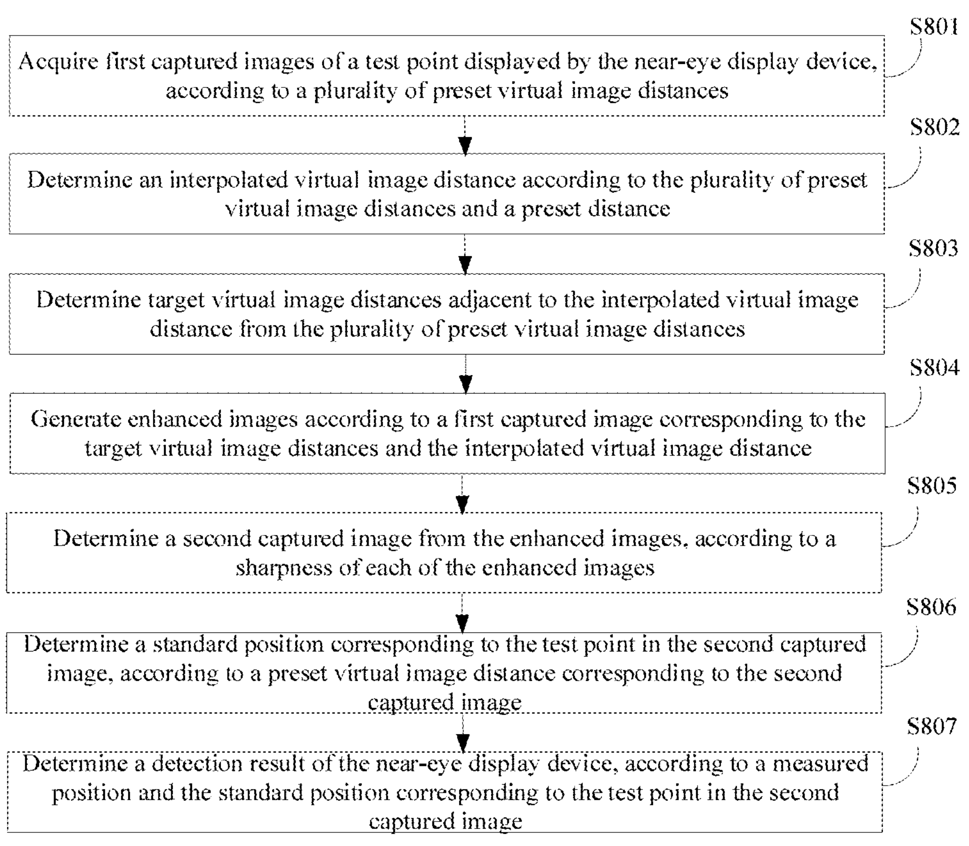
FIG. 8 is a flowchart of the testing method for the near-eye display device provided by another embodiment of the present application.

FIG. 8 is a flowchart of the testing method for the near-eye display device provided by another embodiment of the present application. The testing method for a near-eye display device includes the following processes:

In block S801, first captured images of a test point displayed by the near-eye display device are acquired, according to a plurality of preset virtual image distances.

The detailed content in block S801 can refer to the detailed descriptions in block S201 in FIG. 2 as mentioned above, thus, it is not repeated here.

In block S802, an interpolated virtual image distance is determined according to the plurality of preset virtual image distances and a preset distance.

In at least one embodiment of the present application, the preset virtual image distances and the preset distance can be set and adjusted according to actual requirements. The interpolated virtual image distance includes a first interpolated virtual image distance and a second interpolated virtual image distance. The first interpolated virtual image distance can be a sum of a smallest preset virtual image distance among the preset virtual image distances and the preset distance. The second interpolated virtual image distance can be a sum of the first interpolated virtual image distance and the preset distance. The difference between two adjacent interpolated virtual image distances is the same with the preset distance. For example, in response that the preset virtual image distances include 0.995 meters and 1 meter, and the preset distance is 10 millimeters (0.01 meters), with the smallest preset virtual image distance being 0.995 meters, the first interpolated virtual image distance can be the sum of the smallest preset virtual image distance and the preset distance. For example, 0.995+0.001=0.996 meters. The second interpolated virtual image distance can be the sum of the first interpolated virtual image distance and the preset distance. For example, 0.996+0.001=0.997 meters. Following this pattern, additional second interpolated virtual image distances can include 0.997+0.001=0.998 meters, 0.998+0.001=0.999 meters.

In another embodiment, the first interpolated virtual image distance can be a difference between a largest preset virtual image distance among the preset virtual image distances and the preset distance. The second interpolated virtual image distance can be a difference between the first interpolated virtual image distance and the preset distance. The difference between two adjacent interpolated virtual image distances is the same with the preset distance. For example, in response that the preset virtual image distances include 0.995 meters and 1 meter, and the preset distance is 10 millimeters, as the largest preset virtual image distance is 1 meter, the first interpolated virtual image distance can be the difference between the largest preset virtual image distance and the preset distance. For example, 1−0.001=0.999 meters. The second interpolated virtual image distance can be the difference between the first interpolated virtual image distance and the preset distance. For example, 0.999−0.001=0.998 meters. Additional second interpolated virtual image distances can include 0.998−0.001=0.997 meters, 0.997−0.001=0.996 meters.

S803, target virtual image distances are determined adjacent to the interpolated virtual image distance from the plurality of preset virtual image distances.

In at least one embodiment of the present application, a number of the target virtual image distances is greater than or equal to a preset number. The target virtual image distances can be set and adjusted according to actual needs. For example, the preset number can be set to 2. The target virtual image distances can include preset virtual image distances where an absolute difference between each of the preset virtual image distances and the interpolated virtual image distance is less than a preset difference value. For example, in response that the preset virtual image distances include 0.990 meters, 0.995 meters, 1 meter, 1.005 meters, 1.010 meters, the interpolated virtual image distance is 0.996 meters, and the preset difference value is 0.005 meters, the electronic device calculates the absolute difference between each of the virtual image distances and the interpolated virtual image distance. For example, for a preset virtual image distance "0.990 meters", the absolute difference between the preset virtual image distance "0.990 meters" and the interpolated virtual image distance "0.996 meters": |0.990−0.996|=0.006. For a preset virtual image distance "0.995 meters", the absolute difference between the preset virtual image distance "0.995 meters" and the interpolated virtual image distance "0.996 meters": |0.995−0.996|=0.001. For a preset virtual image distance "1.000 meters", the absolute difference between the preset virtual image distance "1.000 meters" and the interpolated virtual image distance "0.996 meters": |1.000−0.996|=0.004. For a preset virtual image distance "1.005 meters", the absolute difference between the preset virtual image distance "1.005 meters" and the interpolated virtual image distance "0.996 meters": |1.005−0.996|=0.009. For a preset virtual image distance "1.010 meters", the absolute difference between the preset virtual image distance "1.010 meters" and the interpolated virtual image distance "0.996 meters" is represented as: |1.010−0.996|=0.014. Therefore, the target virtual image distances include 0.995 meters and 1 meter.

In block S804, enhanced images are generated according to a first captured image corresponding to the target virtual image distances and the interpolated virtual image distance.

In at least one embodiment of the present application, the electronic device determines a weighted pixel value corresponding to each pixel point, based on the pixel values of each pixel point in the first captured image corresponding to the target virtual image distances and the absolute differences between the target virtual image distances and the interpolated virtual image distance. A simulated image corresponding to the interpolated virtual image distance is obtained based on the weighted pixel values corresponding to each pixel point, and the first captured image and the simulated image are determined as the enhanced images.

A weighted pixel value can be a weighted sum of corresponding pixel values from the first captured images corresponding to the target virtual image distances. A weight of each of the first captured images corresponding to the target virtual image distances can be determined based on the absolute difference between the target virtual image distances and the interpolated virtual image distance, the weight of each of the first captured images corresponding to the target virtual image distances is inversely proportional to the absolute difference between the target virtual image distances and the interpolated virtual image distance. For example, the greater the absolute difference between the target virtual image distances and the interpolated virtual image distance, the smaller the weight of the first captured image corresponding to the target virtual image distance.

For example, the target virtual image distances include 0.995 meters and 1 meter, and the interpolated virtual image distance is 0.997 meters. A first captured image corresponding to the target virtual image distance of 0.995 meters includes 4 pixel points, namely pixel point "a1", pixel point "b1", pixel point "c1", and pixel point "d1". The pixel value of pixel point "a1" is 0, the pixel value of pixel point "b1" is 1, the pixel value of pixel point "c1" is 1, the pixel value of pixel point "d1" is 0, and the weight of the first captured image corresponding to the target virtual image distance of 0.995 meters is 0.6. The first captured image corresponding to the target virtual image distance of 1 meter includes 4 pixel points, namely pixel point "a2", pixel point "b2", pixel point "c2", and pixel point "d2". The pixel value of pixel point "a2" is 0, the pixel value of pixel point "b2" is 0, the pixel value of pixel point "c2" is 1, the pixel value of pixel point "d2" is 1, and the weight of the first captured image corresponding to the target virtual image distance of 1 meter is 0.4. The pixel point "a1" corresponds to the pixel point "a2", the pixel point "b1" corresponds to the pixel point "b2", the pixel point "c1" corresponds to the pixel point "c2", and the pixel point "d1" corresponds to the pixel point "d2". Then, a weighted pixel value of pixel point "a3" in a simulated image can be determined by weighting the pixel value of the pixel point "a1" and the pixel value of the pixel point "a2". The weighted pixel value of the pixel point "a3" in the simulated image is: 0*0.6+0*0.4=0. In turn, a weighted pixel value of pixel point "b3" in the simulated image can be determined as: 1*0.6+0*0.4=0.6, a weighted pixel value of pixel point "c3" in the simulated image is: 1*0.6+1*0.4=1, and a weighted pixel value of pixel point "d3" in the simulated image is: 0*0.6+1*0.4=0.4.

In this embodiment, weighted pixel values for each pixel point can be reasonably determined based on the pixel values in the first captured images corresponding to the target virtual image distances, thereby quickly obtaining a simulated image corresponding to the interpolated virtual image distance and increasing the number of enhanced images.

In block S805, a second captured image is determined from the enhanced images, according to a sharpness of each of the enhanced images.

In at least one embodiment of the present application, a method for determining the second captured image from the enhanced images according to the sharpness of each of the enhanced images is similar to a method for determining the second captured image from the first captured images according to the sharpness of each of the first captured images, it is not repeated here.

In block S806, a standard position corresponding to the test point in the second captured image is determined, according to a preset virtual image distance corresponding to the second captured image.

In block S807, a detection result of the near-eye display device is determined, according to a measured position and the standard position corresponding to the test point in the second captured image.

The detailed content of blocks S806-S807 can refer to the detailed descriptions of blocks S203-S204 in FIG. 2 as mentioned above, it is not repeated here.

In these embodiments, the enhanced images can be accurately and quickly obtained by combining the first captured images corresponding to the target virtual image distances and the interpolated virtual image distance, thereby increasing the number of enhanced images. Since it doesn't require additional camera devices to obtain images, it can save performance overhead of the camera devices. As the number of enhanced images is greater than the number of first captured images, the accuracy of testing results can be improved by analyzing the enhanced images, thus, it is beneficial for more precise calibration of the near-eye display device.

Figure 9:
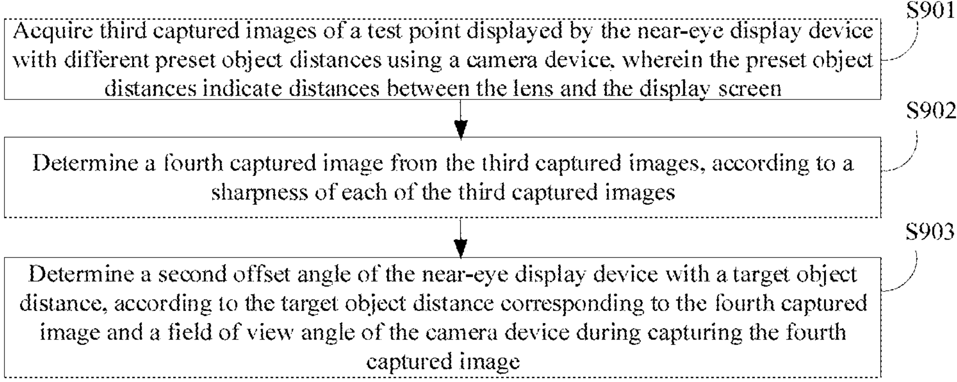
FIG. 9 is a flowchart of the testing method for the near-eye display device provided by another embodiment of the present application.

FIG. 9 is a flowchart of the testing method for the near-eye display device provided by another embodiment of the present application. The testing method for a near-eye display device includes the following processes:

In block S901, third captured images of a test point displayed by the near-eye display device with different preset object distances are acquired using a camera device.

Figure 10:
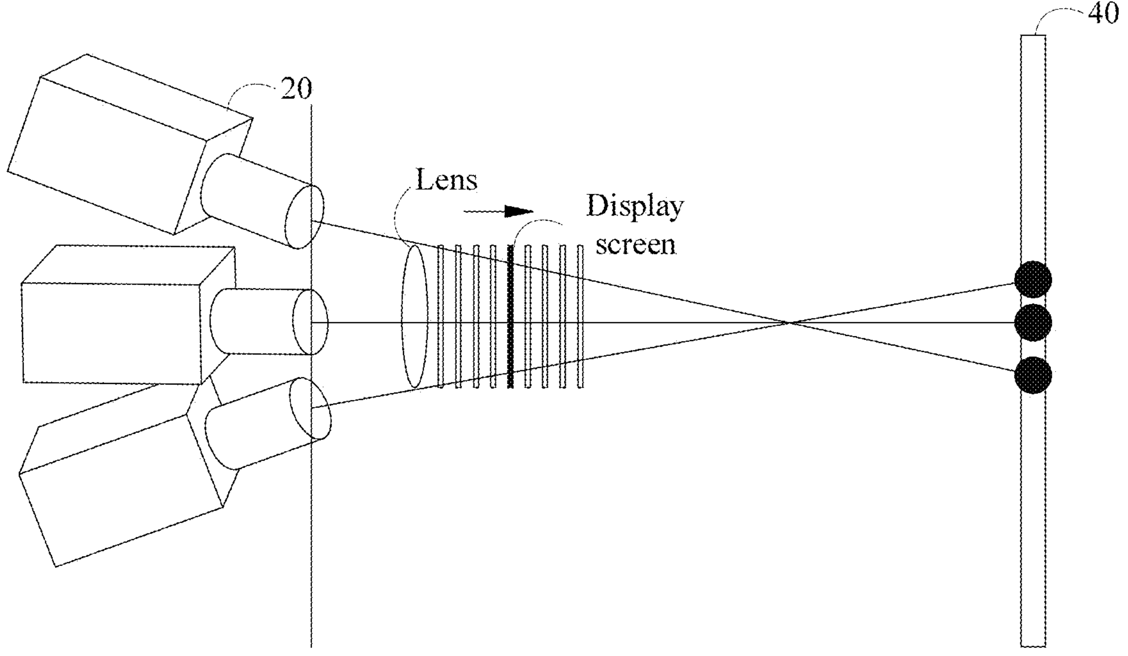
FIG. 10 is a schematic diagram showing movement of the display screen in a near-eye display device provided by embodiments of the present application.

In at least one embodiment of the present application, the preset object distances indicate distances between the lens and the display screen in the near-eye display device. The electronic device determines a position of the lens in the near-eye display device, determines target positions corresponding to the display screen based on the position of the lens and the preset object distances. The electronic device controls the display screen to move to the target positions, the distances between the target positions and the position of the lens is the same with the preset distance. The electronic device controls the camera device to capture the test point displayed by the near-eye display device with the preset object distance, and the electronic device obtains the third captured images. As shown in FIG. 10, FIG. 10 is a schematic diagram showing movement of the display screen in a near-eye display device provided by embodiments of the present application. An arrow indicates a moving direction of the display screen. In response that the display screen moves according to the direction shown in FIG. 10, the preset object distance of the near-eye display device increases.

In at least one embodiment of the present application, when detecting that the camera device has completed capturing the test point displayed on the display screen of the near-eye display device with the preset object distance, the electronic device obtains the third captured images from the camera device.

In block S902, a fourth captured image is determined from the third captured images, according to a sharpness of each of the third captured images.

In at least one embodiment of the present application, a method for determining the fourth captured image from the third captured images according to the sharpness of each of the third captured images is similar to a method for determining the second captured image from the first captured images according to the sharpness of each of the first captured images, which is not repeated here.

In at least one embodiment of the present application, the electronic device can perform an enhancement processing on the fourth captured image, the enhancement processing method is similar to a method for generating the enhanced images, which is not repeated here.

In block S903, a second offset angle of the near-eye display device with a target object distance is determined, according to the target object distance corresponding to the fourth captured image and a field of view angle of the camera device during capturing the fourth captured image.

In at least one embodiment of the present application, the second offset angle indicates an offset situation of the display screen in the near-eye display device. The first offset angle and the second offset angle indicate the offset situations of the display screen in different directions.

In at least one embodiment of the present application, the electronic device performs a weighted fitting on the target object distance according to the field of view angle, and obtains a fitting plane. The electronic device determines a plane vector of the fitting plane, and calculates the second offset angle according to the plane vector.

Figure 11:
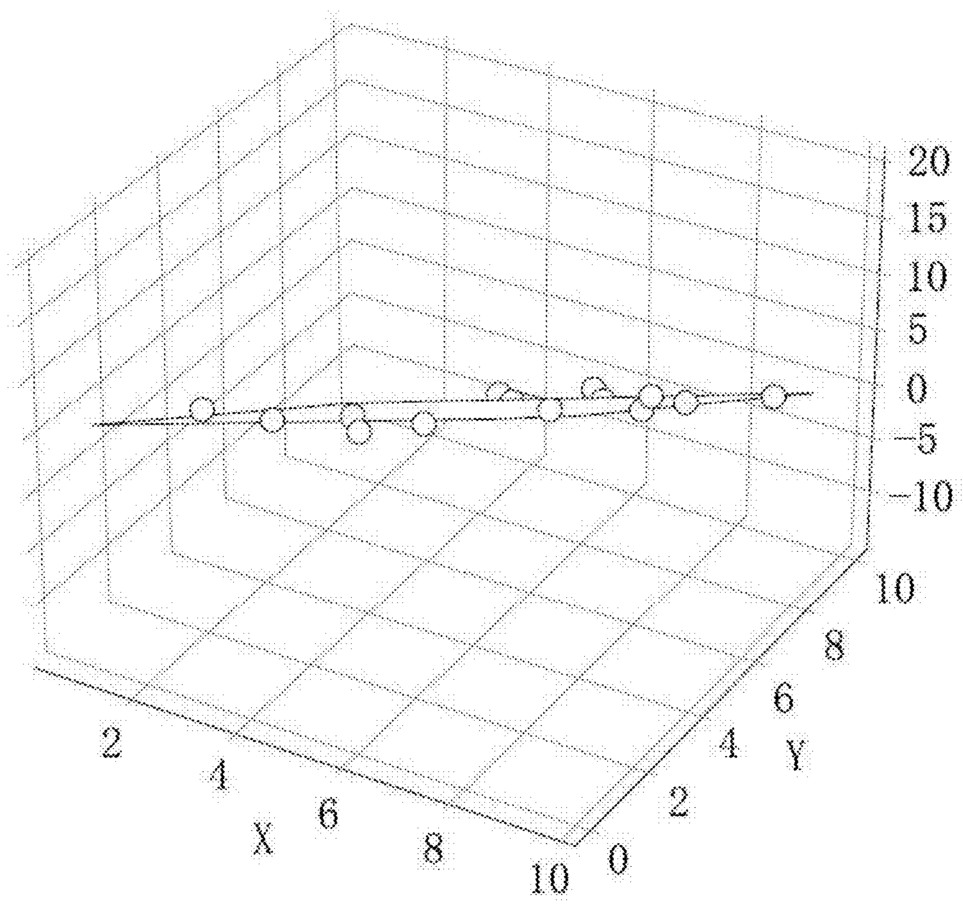
FIG. 11 is a schematic diagram of a fitting plane provided by embodiments of the present application.

The fitting plane can be obtained by using methods such as least squares method, Principal Component Analysis (PCA), Support Vector Machine (SVM), or Gaussian Process Regression (GPR) to perform the weighted fitting on the target object distance according to the field of view angle. As shown in FIG. 11, FIG. 11 is a schematic diagram of a fitting plane provided by embodiments of the present application. FIG. 11 shows the fitting plane obtained through fitting the field of view angle and the target object distance.

The plane vector of the fitting plane can be a normal vector of the fitting plane, the plane vector of the fitting plane is perpendicular to the fitting plane.

A calculation formula for the second offset angle can be: $\theta x=\arctan(a)\times(180/\pi)$, $\theta y=\arctan(b)\times(180/\pi)$. "$\theta x$" represents the second offset angle in the X-axis direction, "$\theta y$" represents the second offset angle in the Y-axis direction, "a" represents a value of the plane vector in the X-axis direction, and "b" represents a value of the plane vector in the Y-axis direction.

In this embodiment, the fitting plane can be quickly obtained by combining the field of view angle and the target object distance, and then determining the second offset angle through the plane vector of the fitting plane.

Figure 12:
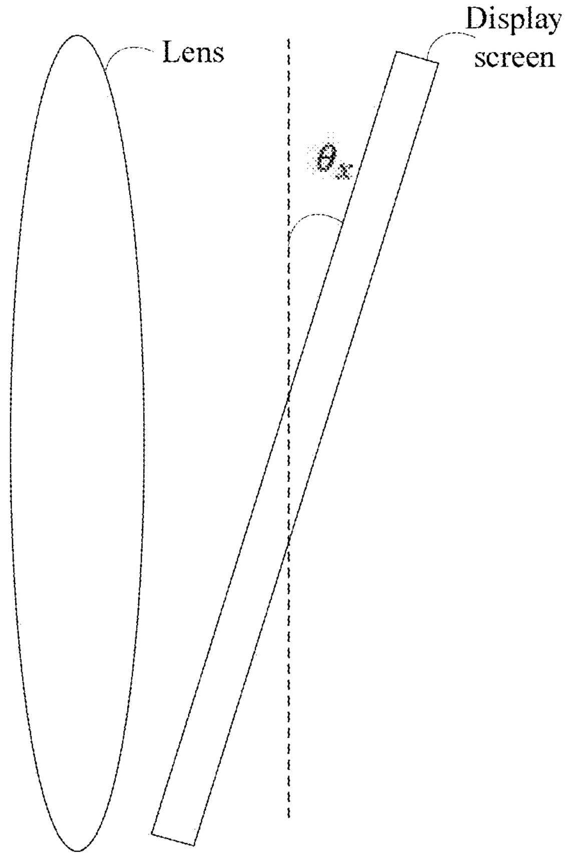
FIG. 12 is a schematic diagram of a second offset angle provided by embodiments of the present application.

In at least one embodiment of the present application, the electronic device calibrates the near-eye display device based on the second offset angle and the target object distance. Specifically, the electronic device rotates the display screen according to the second offset angle and moves the display screen or lens according to the target object distance. As shown in FIG. 12, FIG. 12 is a schematic diagram of a second offset angle provided by embodiments of the present application. FIG. 12 shows a positional relationship between the lens and display screen in the near-eye display device, and shows the second offset angle of the display screen in the X-axis direction. In this embodiment, it is ensured that the imaging center is aligned with the optical axis center and sharp imaging quality is maintained after calibrating the near-eye display device using the second offset angle and target object distance.

In these embodiments, the camera device is used to obtain the third captured images of the test point displayed by the near-eye display device with different preset object distances. According to the sharpness of the third captured images, the fourth captured image is determined from the third captured images, and the fourth captured image corresponding to the near-eye display device under the optimal optical performance can be obtained. According to the target object distance corresponding to the fourth captured image and a field of view angle of the camera device during capturing the fourth captured image, an offset situation of the near-eye display device under the optimal optical performance can be determined, thereby being conducive to the calibration of the near-eye display device and improving the user experience. In addition, since manual quality inspection is not required, it can avoid detection errors and low detection efficiency caused by manual judgment.

Figure 13:
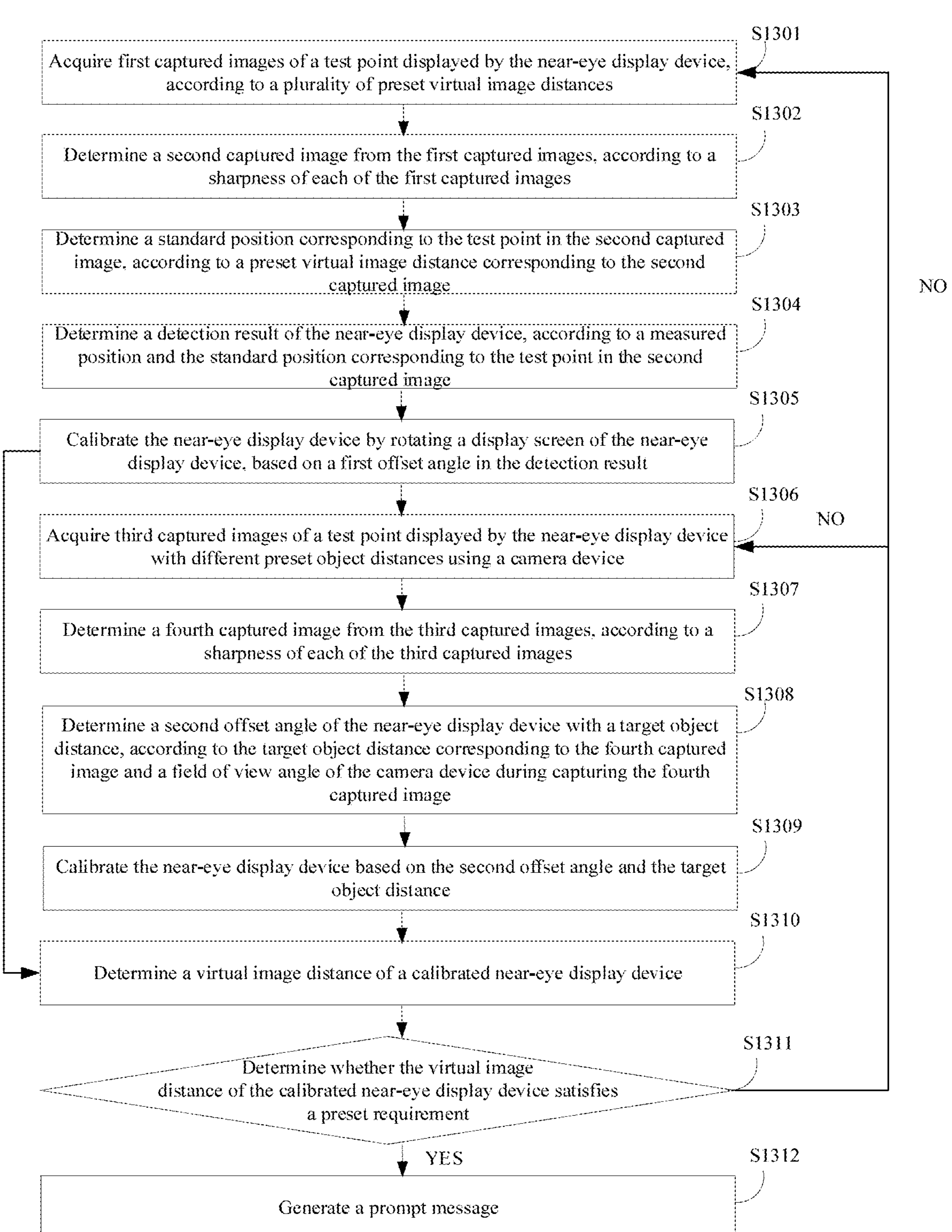
FIG. 13 is a flowchart of the testing method for the near-eye display device provided by another embodiment of the present application.

FIG. 13 is a flowchart of the testing method for the near-eye display device provided by another embodiment of the present application. The testing method for a near-eye display device includes the following processes:

In block S1301, first captured images of a test point displayed by the near-eye display device are acquired, according to a plurality of preset virtual image distances.

In block S1302, a second captured image is determined from the first captured images, according to a sharpness of each of the first captured images.

In block S1303, a standard position corresponding to the test point in the second captured image is determined, according to a preset virtual image distance corresponding to the second captured image.

In block S1304, a detection result of the near-eye display device is determined, according to a measured position and the standard position corresponding to the test point in the second captured image.

In block S1305, the near-eye display device is calibrated by rotating a display screen of the near-eye display device, based on a first offset angle in the detection result.

The detailed content of blocks S1301-S1305 can refer to the detailed descriptions of blocks S201-S204 in FIG. 2 as mentioned above, it is not repeated here.

After completing block S1305, the electronic device executes block S1306 and block S1310.

In block S1306, third captured images of a test point displayed by the near-eye display device with different preset object distances are acquired using a camera device.

In at least one embodiment of the present application, the near-eye display devices with different preset object distances can be the near-eye display device in the block S1301. The near-eye display devices with different preset object distances can also be the near-eye display device after calibration in block S1305.

In block S1307, a fourth captured image is determined from the third captured images, according to a sharpness of each of the third captured images.

In block S1308, a second offset angle of the near-eye display device with a target object distance is determined, according to the target object distance corresponding to the fourth captured image and a field of view angle of the camera device during capturing the fourth captured image.

In block S1309, the near-eye display device is calibrated based on the second offset angle and the target object distance.

The detailed content of blocks S1306-S1309 can refer to the detailed description of blocks S901-S903 in FIG. 9 as mentioned above, it is not repeated here.

In block S1310, a virtual image distance of a calibrated near-eye display device is determined.

In at least one embodiment of the present application, the calibrated near-eye display device can be the near-eye display device that has completed calibration in block S1305. The calibrated near-eye display device can also be the near-eye display device that has completed calibration in block S1309.

In at least one embodiment of the present application, the electronic device can determine the virtual image distance of the calibrated near-eye display device through autofocus technology. The electronic device can also determine the virtual image distance of the calibrated near-eye display device through temperature compensation technology. Additionally, the electronic device can determine the virtual image distance of the calibrated near-eye display device in other ways.

In block S1311, whether the virtual image distance of the calibrated near-eye display device satisfies a preset requirement is determined.

In at least one embodiment of the present application, the preset requirement may include a preset interval, which can be set and adjusted according to actual needs. For example, the preset interval may be [0.999 meters, 1.001 meters]. In response that the virtual image distance of the calibrated near-eye display device is within the preset interval, it is determined that the virtual image distance of the calibrated near-eye display device satisfies the preset requirement, and block S1312 is executed. In response that the virtual image distance of the calibrated near-eye display device is out of the preset interval, it is determined that the virtual image distance of the calibrated near-eye display device does not satisfy the preset requirement, and the block S1301 or the block S1306 is executed.

In block S1312, a prompt message is generated.

In at least one embodiment of the present application, the prompt message indicates that the calibrated near-eye display device satisfies assembly specifications.

In this embodiment, it can be ensured that the assembled near-eye display device satisfies factory requirements by performing optical detection before assembly through virtual image distance detection of the calibrated device, and thus user experience can be improved.

Figure 14:
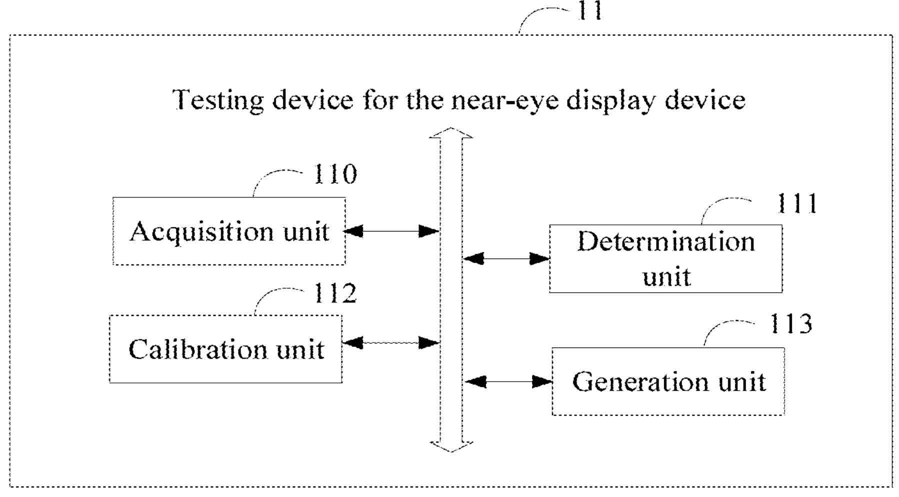
FIG. 14 is a functional module diagram of a testing device for the near-eye display device provided by another embodiment of the present application.

FIG. 14 is a functional module diagram of a testing device for the near-eye display device provided by another embodiment of the present application. The testing device for the near-eye display device 11 includes an acquisition unit 110, a determination unit 111, a calibration unit 112 and a generation unit 113. The modules/units referred to in this application are a series of computer-readable instruction segments that can be acquired by a processor (e.g., processor 1501 shown in FIG. 15) and can complete fixed functions, stored in a storage device (e.g., storage device 1502 shown in FIG. 15).

The acquisition unit 110 is configured to acquire first captured images of a test point displayed by the near-eye display device, according to a plurality of preset virtual image distances; the determination unit 111 is configured to determine a second captured image from the first captured images, according to a sharpness of each of the first captured images; the determination unit 111 is also configured to determine a standard position corresponding to the test point in the second captured image, according to a preset virtual image distance corresponding to the second captured image; and the determination unit 111 is also configured to determine a detection result of the near-eye display device, according to a measured position and the standard position corresponding to the test point in the second captured image.

In one embodiment, the determination unit 111 is also configured to determine an interpolated virtual image distance according to the plurality of preset virtual image distances and a preset distance; the determination unit 111 is also configured to determine target virtual image distances adjacent to the interpolated virtual image distance from the plurality of preset virtual image distances; the determination unit 111 is also configured to generate enhanced images according to a first captured image corresponding to the target virtual image distances and the interpolated virtual image distance.

In one embodiment, the determination unit 111 is configured to: calculate the sharpness of each of the first captured images through a Modulation Transfer Function; determine a first captured image with the highest sharpness as the second captured image.

In one embodiment, the detection result includes a first offset angle, the determination unit 111 is configured to: determine a first offset distance in a first preset direction and a second offset distance in a second preset direction for the test point, according to the measured position and the standard position; calculate the first offset angle based on the first offset distance and the second offset distance.

In one embodiment, the calibration unit 112 is configured to calibrate the near-eye display device by rotating a display screen of the near-eye display device, based on a first offset angle in the detection result.

In one embodiment, the near-eye display device includes a lens and a display screen, the acquisition unit 110 is configured to acquire third captured images of a test point displayed by the near-eye display device with different preset object distances using a camera device, wherein the preset object distances indicate distances between the lens and the display screen; the determination unit 111 is also configured to determine a fourth captured image from the third captured images, according to a sharpness of each of the third captured images; the determination unit 111 is also configured to determine a second offset angle of the near-eye display device with a target object distance, according to the target object distance corresponding to the fourth captured image and a field of view angle of the camera device during capturing the fourth captured image.

In one embodiment, the determination unit 111 is configured to perform a weighted fitting on the target object distance according to the field of view angle, and obtain a fitting plane; determine a plane vector of the fitting plane; and calculate the second offset angle according to the plane vector.

In one embodiment, the calibration unit 112 is also configured to calibrate the near-eye display device based on the second offset angle and the target object distance.

In one embodiment, the determination unit 111 is also configured to determine a virtual image distance of a calibrated near-eye display device; the generation unit 113 is configured to in response that the virtual image distance of the calibrated near-eye display device satisfies a preset requirement, generate a prompt message, which indicates that the calibrated near-eye display device satisfies assembly specifications.

In the embodiments of the present application, the first captured images of the test point displayed by the near-eye display device are acquired through the plurality of preset virtual image distances, and the second captured image is determined based on the sharpness of the first captured images, which is capable of obtaining the second captured image corresponding to the near-eye display device under optimal optical performance. By the preset virtual image distance corresponding to the second captured image, a standard position of the test point in the second captured image can be determined, and by combining the standard position and the measured position, the detection result of the near-eye display device under the optimal optical performance can be determined, thereby facilitating the calibration of the near-eye display device and improving user experience. In addition, since manual quality inspection is not required, it can avoid detection errors and low detection efficiency caused by manual judgment.

Figure 15:
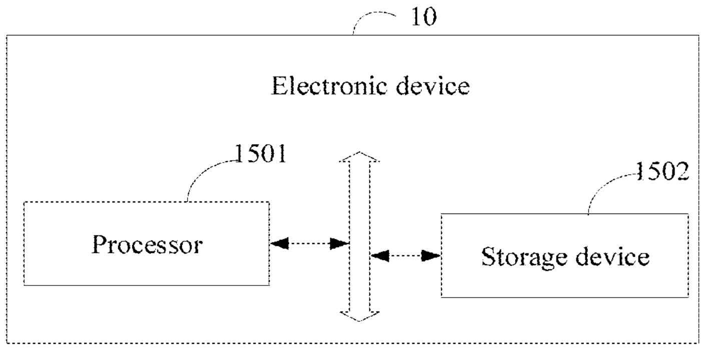
FIG. 15 is a structural diagram of an electronic device implementing the testing method for the near-eye display device provided by another embodiment of the present application.

FIG. 15 is a structural diagram of an electronic device implementing the testing method for the near-eye display device provided by another embodiment of the present application.

In one embodiment of the present application, the electronic device 10 includes, but is not limited to a storage device 1502, a processor 1501, and a computer program, such as a testing program for the near-eye display device, stored in the storage device 1502 and can be invoked by the processor.

It will be understood by those skilled in the art that the schematic drawings are merely examples of the electronic device 10 and do not constitute a limitation of the electronic device 10, and may include more or fewer components than illustrated, or a combination of certain components, or different components, e.g., the electronic device 10 may also include an input/output device, a network access device, a bus, and the like.

The processor 1501 may be a central processing unit (CPU), or may be other general purpose processors, a digital signal processor (DSP), an Application Specific Integrated Circuit (ASIC), a Field-Programmable Gate Array (FPGA) or other programmable logic devices, discrete gate or transistor logic devices, discrete hardware components, and so on. The general-purpose processor can be a microprocessor or any conventional processor. The processor 1501 is the computing core and control center of the electronic device 10. It uses a variety of interfaces and lines to connect various parts of the entire electronic device 10, executes the operating system of the electronic device 10, and installs various types of application programs and program code, etc.

The processor 1501 retrieves the operating system of the electronic device 10 and various installed application programs. The processor 1501 retrieves the application programs to implement the blocks in the embodiments of the above-mentioned detection methods for each near-eye display device, such as the blocks shown in FIG. 2.

Exemplarily, the computer program can be divided into one or more modules/units. One or more modules/units are stored in the storage device 1502 and retrieved by the processor 1501 to complete the tasks of the present application. One or more modules/units can be a series of computer program instruction segments capable of completing specific functions, and these instruction segments are used to describe the retrieval process of the computer program in the electronic device 10.

The storage device 1502 can be used to store computer programs and/or modules. The processor 1501 implements various functions of the electronic device 10 by running or retrieving the computer programs and/or modules stored in the storage device 1502 and invoking the data stored in the storage device 1502. The storage device 1502 can mainly include a program storage area and a data storage area. The program storage area can store an operating system, application programs required for at least one function (such as a sound playback function, an image playback function, etc.), and so on. The data storage area can store data created according to the use of the electronic device. In addition, the storage device 1502 can include non-transitory storage device, such as a hard disk, internal memory, plug-in hard disk, Smart Media Card (SMC), Secure Digital (SD) card, Flash Card, at least one disk storage device, flash device, or other non-transitory solid-state storage devices.

The storage device 1502 can be an external memory and/or an internal memory of the electronic device 10. Further, the storage device 1502 can be a memory having a physical form, such as a memory stick, a Trans-flash Card, and the like.

The modules/units integrated in the electronic device 10 may be stored in a computer-readable storage medium if implemented as software functional units and sold or used as stand-alone products. Based on this understanding, all or part of the processes in the method of above-described embodiments may also be realized by the present application through computer-readable instructions to instruct the relevant hardware to complete, and the computer-readable instructions may be stored in a computer-readable storage medium, which computer-readable instructions, when executed by a processor, may realize the blocks of above-described method embodiments.

Among them, the computer-readable instructions include computer-readable instruction codes, which can be in the form of source code, object code, executable files, or some intermediate forms. The computer-readable medium can include any entity or device capable of carrying computer-readable instruction codes, recording media, USB flash drives, mobile hard disks, magnetic disks, optical disks, computer memories, Read-Only Memory (ROM), Random Access Memory (Ram).

The storage device 1502 can be used to store computer-readable instructions and/or modules. The processor 1501 implements various functions of the electronic device 10 by running or executing the computer-readable instructions and/or modules stored in the storage device 1502 and invoking the data stored in the storage device 1502. The storage device 1502 can mainly include a program storage area and a data storage area. The program storage area can store an operating system, application programs required for at least one function (such as a sound playback function, an image playback function, etc.), and so on. The data storage area can store data created according to the use of the electronic device. The storage device 1502 can include non-transitory and volatile memory, such as a hard disk, internal memory, plug-in hard disk, Smart Media Card (SMC), Secure Digital (SD) card, Flash Card, at least one disk storage device, flash device, or other storage devices.

Exemplarily, the computer-readable instructions can be divided into one or more modules/units. One or more modules/units are stored in the storage device 1502 and executed by the processor 1501 to complete the tasks of this application. One or more modules/units can be a series of computer-readable instruction segments capable of completing specific functions. The computer-readable instruction segments are used to describe the execution process of the computer-readable instructions in the electronic device 10. For example, the computer-readable instructions can be divided into an acquisition unit 110, a determination unit 111, a calibration unit 112, and a generation unit 113.

For detailed information about the functions of each module/unit, please refer to the detailed descriptions of FIG. 2, FIG. 8, FIG. 9, and FIG. 13 above, and the descriptions will not be repeated here.

In the several embodiments provided in this application, it should be understood that the disclosed system, device, and method can be implemented in other ways. For example, the device embodiments described above are merely illustrative. For instance, the division of modules is only a logical functional division, and there may be other division methods in actual implementation.

Modules described as separate components may or may not be physically separated. Components shown as modules may or may not be physical units, that is, they may be located in one place or distributed across multiple network units. Some or all of the modules can be selected according to actual needs to achieve the purpose of the solution in this embodiment.

In addition, each functional module in various embodiments of this application can be integrated into one processing unit, or each unit can exist physically alone, or two or more units can be integrated into one unit. The above-integrated units can be implemented in the form of hardware or in the form of hardware combined with software functional modules.

Therefore, from any aspect, the embodiments should be regarded as exemplary and not restrictive. The scope of this application is defined by the appended claims rather than the above description. Therefore, all changes that fall within the meaning and scope of the equivalent elements of the claims are intended to be included in this application. Any reference signs in the claims should not be regarded as limiting the claims involved.

In addition, obviously, the word "comprising" does not exclude other units or steps, and the singular does not exclude the plural. Multiple units or devices can also be implemented by one unit or device through software or hardware. Words such as "first" and "second" are used to denote names and do not represent any specific order.

Finally, it should be noted that the above embodiments are only used to illustrate the technical solutions of this application rather than to limit them. Although this application has been described in detail with reference to the preferred embodiments, those of ordinary skill in the art should understand that the technical solutions of this application can be modified or equivalently replaced without departing from the spirit and scope of the technical solutions of this application.

The invention claimed is:

1. A testing method for a near-eye display device, the method comprising:

acquiring first captured images of a test point displayed by the near-eye display device, according to a plurality of preset virtual image distances;

determining a second captured image from the first captured images, according to a sharpness of each of the first captured images;

determining a standard position corresponding to the test point in the second captured image, according to a preset virtual image distance corresponding to the second captured image; and determining a detection result of the near-eye display device, according to a measured position and the standard position corresponding to the test point in the second captured image.

2. The testing method for the near-eye display device of claim 1, further comprising:

determining an interpolated virtual image distance according to the plurality of preset virtual image distances and a preset distance;

determining target virtual image distances adjacent to the interpolated virtual image distance from the plurality of preset virtual image distances; and generating enhanced images according to a first captured image corresponding to the target virtual image distances and the interpolated virtual image distance.

3. The testing method for the near-eye display device of claim 1, wherein determining the second captured image from the first captured images, according to the sharpness of each of the first captured images comprises:

calculating the sharpness of each of the first captured images through a Modulation Transfer Function; and determining a first captured image with the highest sharpness as the second captured image.

4. The testing method for the near-eye display device of claim 1, wherein the detection result comprises a first offset angle, and determining the detection result of the near-eye display device, according to the measured position and the standard position corresponding to the test point in the second captured image comprises:

determining a first offset distance in a first preset direction and a second offset distance in a second preset direction for the test point, according to the measured position and the standard position; and calculating the first offset angle based on the first offset distance and the second offset distance.

5. The testing method for the near-eye display device of claim 1, further comprising:

calibrating the near-eye display device by rotating a display screen of the near-eye display device, based on a first offset angle in the detection result.

6. The testing method for the near-eye display device of claim 5, wherein the method further comprises:

determining a virtual image distance of a calibrated near-eye display device;

in response that the virtual image distance of the calibrated near-eye display device satisfies a preset requirement, generating a prompt message, which indicates that the calibrated near-eye display device satisfies assembly specifications.

7. The testing method for the near-eye display device of claim 1, wherein the near-eye display device comprises a lens and a display screen, and the method further comprises:

acquiring third captured images of a test point displayed by the near-eye display device with different preset object distances using a camera device, wherein the preset object distances indicate distances between the lens and the display screen;

determining a fourth captured image from the third captured images, according to a sharpness of each of the third captured images;

determining a second offset angle of the near-eye display device with a target object distance, according to the target object distance corresponding to the fourth captured image and a field of view angle of the camera device during capturing the fourth captured image.

8. The testing method for the near-eye display device of claim 7, wherein determining the second offset angle of the near-eye display device with the target object distance, according to the target object distance corresponding to the fourth captured image and the field of view angle of the camera device during capturing the fourth captured image comprises:

performing a weighted fitting on the target object distance according to the field of view angle, and obtaining a fitting plane;

determining a plane vector of the fitting plane; and calculating the second offset angle according to the plane vector.

9. The testing method for the near-eye display device of claim 7, wherein the method further comprises:

calibrating the near-eye display device based on the second offset angle and the target object distance.

10. An electronic device comprising:

a processor; and a storage device storing a plurality of instructions, which when executed by the processor, cause the processor to:

acquire first captured images of a test point displayed by the near-eye display device, according to a plurality of preset virtual image distances;

determine a second captured image from the first captured images, according to a sharpness of each of the first captured images;

determine a standard position corresponding to the test point in the second captured image, according to a preset virtual image distance corresponding to the second captured image; and determine a detection result of the near-eye display device, according to a measured position and the standard position corresponding to the test point in the second captured image.

11. The electronic device of claim 10, wherein the processor is further caused to:

determine an interpolated virtual image distance according to the plurality of preset virtual image distances and a preset distance;

determine target virtual image distances adjacent to the interpolated virtual image distance from the plurality of preset virtual image distances; and generate enhanced images according to a first captured image corresponding to the target virtual image distances and the interpolated virtual image distance.

12. The electronic device of claim 10, wherein the processor is further caused to:

calculate the sharpness of each of the first captured images through a Modulation Transfer Function; and determine a first captured image with the highest sharpness as the second captured image.

13. The electronic device of claim 10, wherein the processor is further caused to:

determine a first offset distance in a first preset direction and a second offset distance in a second preset direction for the test point, according to the measured position and the standard position; and calculate the first offset angle based on the first offset distance and the second offset distance.

14. The electronic device of claim 10, wherein the processor is further caused to:

acquire third captured images of a test point displayed by the near-eye display device with different preset object distances using a camera device, wherein the preset object distances indicate distances between the lens and the display screen;

determine a fourth captured image from the third captured images, according to a sharpness of each of the third captured images;

determine a second offset angle of the near-eye display device with a target object distance, according to the target object distance corresponding to the fourth captured image and a field of view angle of the camera device during capturing the fourth captured image.

15. The electronic device of claim 14, wherein the processor is further caused to:

perform a weighted fitting on the target object distance according to the field of view angle, and obtain a fitting plane;

determine a plane vector of the fitting plane; and calculate the second offset angle according to the plane vector.

16. A non-transitory storage medium having stored thereon at least one computer-readable instructions, which when executed by a processor of an electronic device, causes the processor to perform a testing method for the near-eye display device, the method comprising:

acquiring first captured images of a test point displayed by the near-eye display device, according to a plurality of preset virtual image distances;

determining a second captured image from the first captured images, according to a sharpness of each of the first captured images;

determining a standard position corresponding to the test point in the second captured image, according to a preset virtual image distance corresponding to the second captured image; and determining a detection result of the near-eye display device, according to a measured position and the standard position corresponding to the test point in the second captured image.

17. The non-transitory storage medium of claim 16, the method comprising:

determining an interpolated virtual image distance according to the plurality of preset virtual image distances and a preset distance;

determining target virtual image distances adjacent to the interpolated virtual image distance from the plurality of preset virtual image distances; and generating enhanced images according to a first captured image corresponding to the target virtual image distances and the interpolated virtual image distance.

18. The non-transitory storage medium of claim 16, wherein determining the second captured image from the first captured images, according to the sharpness of each of the first captured images comprises:

calculating the sharpness of each of the first captured images through a Modulation Transfer Function; and determining a first captured image with the highest sharpness as the second captured image.

19. The non-transitory storage medium of claim 16, wherein the detection result comprises a first offset angle, and determining the detection result of the near-eye display device, according to the measured position and the standard position corresponding to the test point in the second captured image comprises:

determining a first offset distance in a first preset direction and a second offset distance in a second preset direction for the test point, according to the measured position and the standard position; and calculating the first offset angle based on the first offset distance and the second offset distance.

20. The non-transitory storage medium of claim 16, wherein the near-eye display device comprises a lens and a display screen, and the method further comprises:

acquiring third captured images of a test point displayed by the near-eye display device with different preset object distances using a camera device, wherein the preset object distances indicate distances between the lens and the display screen;

determining a fourth captured image from the third captured images, according to a sharpness of each of the third captured images;

determining a second offset angle of the near-eye display device with a target object distance, according to the target object distance corresponding to the fourth captured image and a field of view angle of the camera device during capturing the fourth captured image.

* * * * *